UNITED STATES PATENT OFFICE.

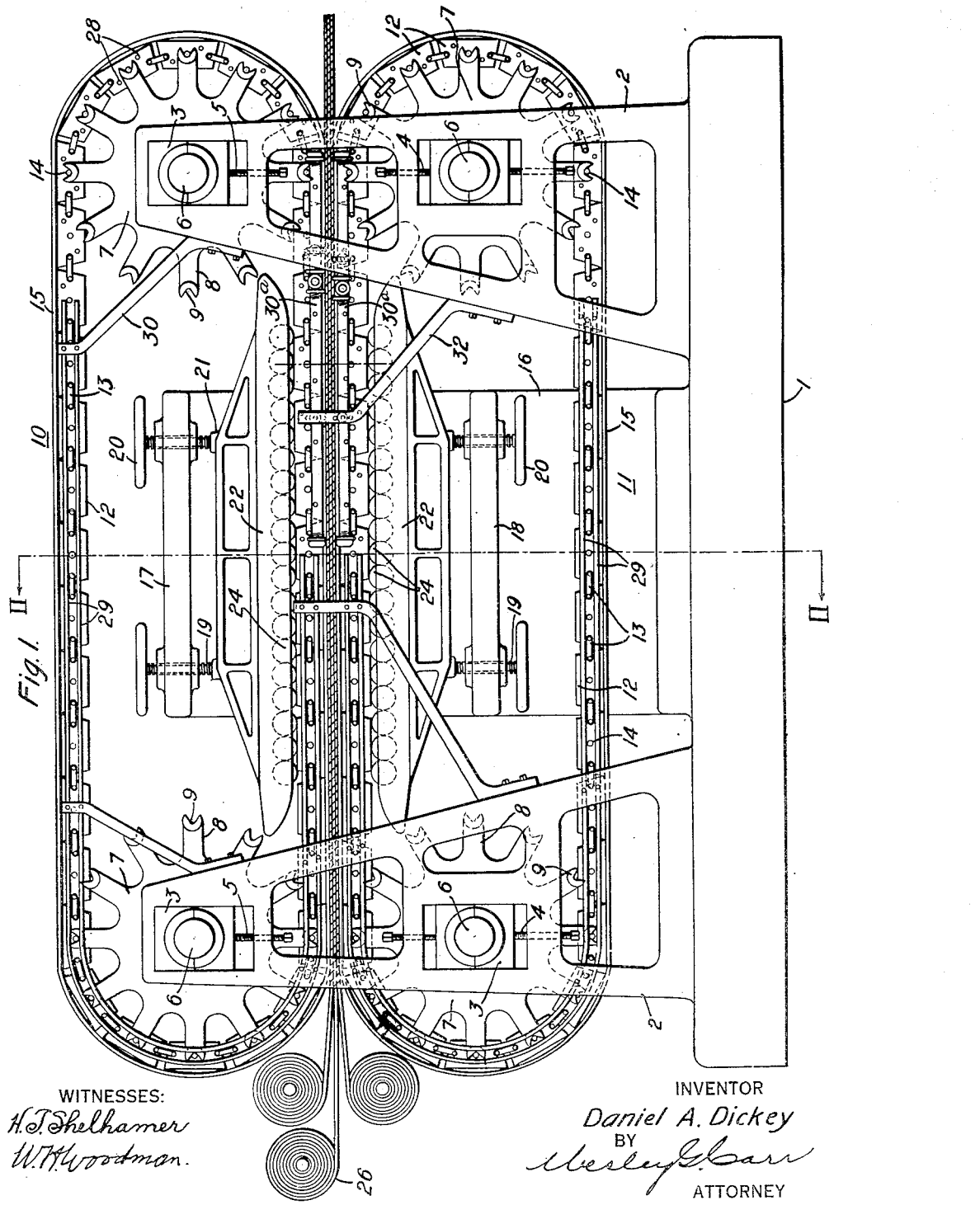

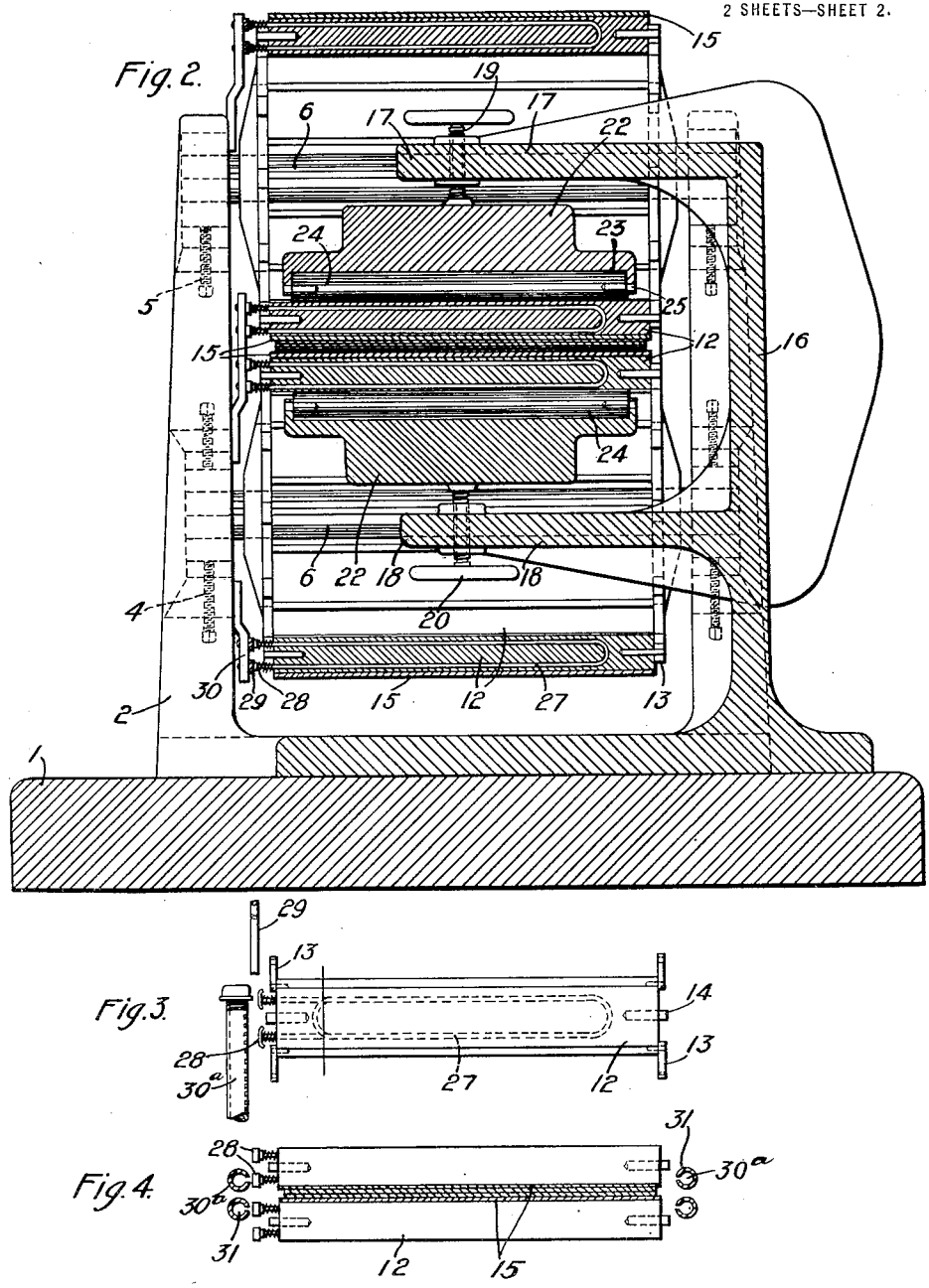

DANIEL ADAM DICKEY, OF WILKINSBURG, PENNSYLVANIA, ASSIGNOR TO WESTINGHOUSE ELECTRIC & MANUFACTURING COMPANY, A CORPORATION OF PENNSYLVANIA.

COMPOSITE-PLATE-CURING MACHINE.

1,361,970.     Specification of Letters Patent.     Patented Dec. 14, 1920.

Application filed February 15, 1919. Serial No. 277,246.

*To all whom it may concern:*

Be it known that I, DANIEL A. DICKEY, a citizen of the United States, and a resident of Wilkinsburg, in the county of Allegheny and State of Pennsylvania, have invented a new and useful Improvement in Composite-Plate-Curing Machines, of which the following is a specification.

My invention relates to a machine for, and method of, curing composite plates and it has, for its primary object, the provision of a machine adapted for curing composite plates comprising superimposed layers of fibrous sheet material impregnated with a binder, such as a phenolic condensation product or other shellac substitute, which is capable of being rendered hard by application of heat and pressure.

Heretofore, plates of the above designated character have been molded or cured by disposing them between the heated platens of a hydraulic press. This method, while very satisfactory for plates or sheets of certain sizes, cannot be employed for molding unusually long plates, as the size of a press necessary for such purpose would be prohibitive.

Plates of this character and of any desired length have also been molded or cured by the employment of a hydraulic press, the platens of which have heated intermediate portions and cooled end portions so that an assembled plate of the impregnated sheet material may be passed between them by a step-by-step method, the cooled sections of the platens protecting the already cured and the next-to-be-cured portions of the assembled sheet while the intermediate heated portions cure intermediate sections. This process, however, is slow because of the fact that the heated sections must be cooled between successive advances of the sheet, as the cured sheet should be kept under pressure until it has been cooled, to avoid blistering and like defects. Also, when operating a press of this character, great care is required, in order to obtain a uniform product, as the pressure applied to the successive portions of the plate, the temperature to which they are heated and the length of time to which they are subjected to heat must be the same for each section, if the product is to be uniform.

It has also been proposed to form long or continuous composite plates of fibrous sheet material, impregnated with a binder, by passing the assembled sheet between heated pressure rollers or between a series of such rollers and, subsequently, between cooling rollers. This method, however, is only applicable to relatively thin sheets and is open to the objection that the pressure cannot be uniformly maintained during the heating and subsequent cooling of the sheet.

In view of these facts, one object of my invention resides in constructing a machine of such character that an assembled sheet or plate, comprising superimposed layers of fibrous sheet material and a binder, may be continuously and uninterruptedly passed through the machine and successively heated and cooled while being continuously subjected to pressure.

A still further object of my invention consists in providing a machine which may be adjusted to mold or cure plates of various thicknesses and which may be substantially automatic in its action, requiring practically no attention.

With these and other objects in view, my invention will be more fully described, illustrated in the drawings, in the several views of which corresponding numerals indicate like parts, and then particularly pointed out in the claims.

Figure 1 is a side elevation of an embodiment of my machine; Fig. 2 is a vertical sectional view taken substantially on the line II—II of Fig. 1, looking in the direction of the arrows; Fig. 3 is a fragmentary elevation, illustrating the methods of heating and cooling the plate being cured, and Fig. 4 is an elevation of the structure shown in Fig. 3, with the plate shown in section.

Referring more particularly to Figs. 1 and 2 of the drawings, my machine may comprise a base 1 and spaced end frames 2 in each of which are disposed vertically alined split bearings 3. The lower of the split bearings are adjustable by means of upper and lower adjusting bolts 4 while the upper bearings are adjustable by bolts 5. Each pair of bearings receives a shaft 6 and each shaft carries fixed sprocket wheels 7 having a plurality of radial arms, or spokes, 8 with forked terminals 9.

The sprocket wheels form the supporting and driving means for upper and lower tractor belts 10 and 11, of caterpillar-like construction.

As the tractor belts are identical in construction, a description of one will suffice for both. Each tractor belt may comprise a series of transversely extending press plates or blocks 12, pivotally connected by links 13, and formed, at their ends, with trunnions 14 engageable in the forked terminals of the sprocket-wheel arms or spokes. As best shown in Figs. 1 and 3 of the drawings, each of the press plates tapers in width, from its outer to its inner face, to provide for their relative pivotal movement when passing about the sprocket wheels and to insure edge-to-edge engagement against each other along the straight stretches of the belts. Each of the tractor belts may preferably be provided with an outer band or belt 15 of relatively thin, sheet steel of sufficient flexibility to bend over the sprocket wheels but sufficiently strong and rigid to bridge across the necessarily small distances between the adjacent press plates and to thus uniformly transmit any pressure that may be applied by the press plates.

Obviously, by suitable manipulation of the adjusting bolts 4 and 5, the shafts 6, together with the tractor belts supported by them, may be moved, toward and away from each other, to adjust the machine for the passage of composite plates or sheets of various thicknesses between them.

As a means for variably applying pressure to compact a sheet passing between the tractor belts, I may provide, at one side of the base and at a point intermediate the end frames, a press frame 16 having laterally directed arm portions 17 and 18 projecting between the upper and lower stretches of the upper and lower belts, respectively.

Threaded downwardly through the upper press arm and upwardly through the lower press arm, are adjustable pressure-applying screws 19 which may be provided with hand wheels 20 for convenient manipulation and the inner ends of which have swivel-socket engagement in bosses 21 formed upon the outer faces of press platens 22.

Each of the press platens may have its inner face recessed to provide a chamber 23 partially housing a series of pressure-applying rollers 24 which may be mounted for free rotation upon pins 25 projecting through the walls of the chambers. The pressure-applying rollers 24 are adapted to engage the inner faces of the press plates or blocks 12 and are so proportioned, with respect to the plates, that a plurality of them will always engage each plate as the plates pass them. By this means, it will be obvious that the tractor belts may be adjusted to exert any desired degree of pressure against the opposite sides of a composite plate or sheet being drawn between them by means of power applied in any suitable manner (not shown) to one or more of the shafts of both belts In practising my invention, a plurality of supply rolls 26, of fibrous sheet material of suitable character, impregnated with a binder, are supported, in any preferred manner, at one end of the machine, and these sheets, in superimposed relation, are introduced into the end of the machine between the tractor belts which engage against the upper and lower faces of the composite sheet, thus provided, to draw it through the machine. The cured sheet, as it passes from the machine at the opposite end of the belts, may be cut into any desired lengths or may be wound about a suitable collecting drum.

As it is essential, in the curing of a composite sheet, that it be first subjected to heat and subsequently cooled while still under pressure, I may provide any suitable means for heating the successive press elements 12, before they approach the supply end of the machine and for maintaining them in a heated condition during a certain portion of the time in which they engage the composite sheet, and I may provide a further means for cooling them during the remainder of the time in which they engage the sheet.

Any preferred means of heating may be provided but I prefer to heat the press plates electrically, as this permits of a simple construction and of ready adjustment of the degree of heat which shall be provided. To accomplish this, each press plate or block 12 may be provided with an inclosed electric heating coil 27, the terminals of which may be led through one end of the plate and connected to spring-pressed contact brushes or shoes 28 that are adapted to engage substantially parallel trolleys 29, included in a suitable source of current supply. The trolleys may be supported by brackets 30 carried by the end frames of the machine. Preferably, the trolleys will be extended along substantially all of the outer stretch of each belt, about those portions of each belt around the sprocket wheels at the supply end of the machine, and along substantially one-half of the inner stretch of each belt. By this means, the press plates of both belts may be heated to any desired extent before they engage the composite plate passing through the machine and may then transmit this heat, through the resilient belts or bands 15, to the plate being treated to heat this plate and maintain it in a hot condition until it reaches an intermediate portion of the machine.

The press plates, after they pass the inner ends of the trolleys, may be cooled, in any suitable manner, to cool the composite plate being cured, before it passes from between the belts.

One simple cooling means which may be employed is disclosed in Figs. 1, 3 and 4 of the drawings and may comprise pipes 30ª disposed parallel with the inner stretches of the belts at both sides from points adjacent the inner ends of the trolleys to points near the discharge end of the machine. These pipes may be connected to any suitable source of compressed air or other cooling fluid and may be provided, along their inner sides, with discharge slots or openings 31 so that a blast of air will be discharged against the press plates of the belts. Brackets 32 may be provided to support these pipes.

In practising my invention, I may provide any desired number of supply rolls of fibrous sheet material, such as paper, duck or other fabric, impregnated with any desired binder, such as a phenolic condensation product, the binder being preferably in a dry, inert condition but capable of being first softened and then permanently hardened, under the application of heat and pressure. Obviously, the number of rolls employed will be dependent upon the desired thickness of the composite plate and upon the character of the sheet material. The ends of as many of these rolls of sheet material as desired may be brought together, to form an end of a composite plate, and may then be inserted between the tractor belts at the supply end of the machine.

By proper adjustment of the bearings of the tractor-belt driving-shafts and by adjustment of the press plates or platens 22, the machine may be readily set for operation upon plates of any desired thickness and may be adapted to exert any desired pressure against the composite plate during its passage through the machine.

With the machine thus adjusted, with the trolleys connected in a suitable circuit, so that the heating coils of the various press plates or blocks of the belts which are opposite them are in closed circuits and with air being supplied to the blast pipes 30ª, power is applied, in any suitable manner, to drive the tractor belts which will draw the composite plate between them.

As the plate passes between the tractor belts, it is subjected to pressure to compact the material of which it is composed and to heat, to first soften and then harden its binder, after which it is cooled while still subjected to pressure. As the molded or cured plate passes from the machine, it may be cut into any desired lengths or it may be wound about a drum. Obviously, as soon as any supply roll becomes exhausted, it may be replaced by another so that there is no limit to the length of a plate which may be cured by the employment of the machine. The flexible steel belts or bands 15 serve to uniformly transmit the pressure of the tractor belts to the composite plate disposed between them and also prevent the formation of any fins transversely of the plate or any pinching off of material such as might otherwise occur because of slight relatively pivotal movement between the press plates.

As the pressure-distributing belts or bands 15 leave the finished plate, they are first wiped to polish them and are then provided with thin coatings of grease or oil in order that they may not stick to the composite sheet when they next engage it. This may be done by hand or by means of suitable polishing and oiling pads mechanically held in engagement with the flexible belts 15.

The speed of the machine or rate of movement of its tractor belts may be varied according to the thickness of the composite sheet being cured, as the thicker the sheet, the longer it must be subjected to heat and pressure. As the composite sheet is kept moving all the time during both the baking and the cooling operations, with fresh sheet material continuously entering the machine and the finished product being continuously expelled, it will be apparent that the quantity production of any machine will depend upon its length, as the longer the machine, the more rapidly it may be driven.

The press platens and the anti-friction pressure-transmitting rollers provide a simple and adjustable means for varying the pressure exerted against the composite plate and do not materially increase the power necessary to operate the machine. However, other pressure-applying means may be employed, such as skids engaging the inner stretches of the belts.

Inasmuch as the composite plate is subjected to pressure during the entire time of its passage through the machine, both while it is being baked and while it is being cooled, there is no danger of non-uniformity in tne finished product, and all possibility of blistering of the surface of the composite plate because of lessening of pressure, while still hot, is obviated.

Obviously, numerous modifications are possible, as the belts may differ widely in construction, various pressure-applying means may be employed, liquid or gaseous fuel burners may be substituted as a heating means, and a water-cooling system may replace the air-cooling system. For these reasons, no limitations are to be imposed upon my invention other than those indicated in the appended claims.

I claim as my invention:

1. A machine for curing composite plates or sheets comprising endless tractor belts between which the treated sheet passes and which are adapted to draw the sheet along, means for forcing the tractor belts into varied engagement with the sheet during its passage, means for applying heat to the sheet during a portion of its passage between the belts, and means for cooling the sheet during the remainder of its passage between the belts.

2. A machine for curing composite plates or sheets comprising endless tractor belts of caterpillar type between which the treated sheet passes and which are adapted to draw the sheet along, flexible continuous bands surrounding the tractor belts to provide smooth pressure-transmitting surfaces for engaging opposite faces of the sheet, adjustable means for applying pressure to the stretches of the belts engaging the sheet to apply pressure to the sheet, and means for heating and subsequently cooling the sheet during its passage between the belts.

3. A machine for curing composite plates or sheets comprising endless tractor belts adapted to draw the treated sheet between them, means for compressing the sheet between the tractor belts, means for heating the tractor belts to heat the sheet during a portion of their engagement with it, and means for cooling the tractor belts to cool the sheet during the remainder of their engagement with it.

4. A machine for curing composite plates or sheets comprising endless driven elements between which the treated sheet is passed, means for forcing such elements into compressive engagement against opposite faces of the sheet, means for applying heat to the sheet during the first portion of its passage between the elements, and means for cooling the sheet during the remainder of its passage between the elements.

5. A machine for curing composite plates or sheets comprising a plurality of pivotally connected, electrically heated press-plates comprising a pair of endless tractor belts between which the treated sheet passes, flexible bands surrounding the belts to engage the sheet with smooth surfaces, means for applying pressure to the belts to force them into engagement with the sheet, means for restricting the heating of the plates to limit the heating of the sheet to the earlier portion of its movement between the belts, and means for cooling the plates to cool the sheet during the remainder of its movement between the belts.

6. A machine for curing composite plates or sheets comprising endless tractor belts between which the treated sheet passes and which are adapted to draw the sheet along, supporting means projecting between the stretches of the several belts, press platens carrying rollers which engage the inner faces of the inner stretches of the belts, and means coöperating between the platens and the supporting means for forcing the rollers against the belts at any desired pressure.

7. A machine for curing composite plates or sheets comprising endless tractor belts between which the treated sheet passes and which are adapted to draw the sheet along, means for adjusting the tractor belts to bring their opposed stretches toward and away from each other, means for applying pressure against the inner faces of the inner stretches of the belts to force them toward each other, and means for first heating and subsequently cooling the sheet during its passage between the inner stretches of the belts.

8. A machine for curing composite plates or sheets comprising endless tractor belts between which the treated sheet passes and which are adapted to draw the sheet along and to apply pressure to it, means for heating portions of the belts prior to their engagement with the sheet and for maintaining them in heated condition for a portion of the time during which they engage the sheet, and means for subsequently cooling such portions of the belts and keeping them cool during the remainder of the time of their engagement with the sheet.

9. A machine for curing composite plates or sheets comprising endless tractor belts between which the treated sheet passes and which are adapted to draw the sheet along and to apply pressure to it, means for heating portions of the belts prior to their engagement with the sheet and for maintaining them in heated condition for a portion of the time during which they engage the sheet, and means for subsequently cooling such portions of the belts and keeping them cool during the remainder of the time of their engagement with the sheet, said latter means including air jets directed against the belts along a certain portion of their path of travel.

10. A machine for curing composite plates or sheets comprising means for continuously and uninterruptedly applying pressure to successive portions of the treated sheet, means for applying heat to the sheet during a portion of the time during which it is subjected to pressure, and means for cooling the sheet during the remainder of time it is subjected to pressure.

11. A machine for curing composite plates or sheets comprising endless tractor belts between which the treated sheet passes, and means for effecting the passage of the sheet between the tractor belts to compress it and to first heat and subsequently cool it during its passage between them.

12. A method of curing composite sheets of any desired length which comprises, continuously and without interruption, subjecting successive portions of a sheet to heat and pressure and cooling such portions without removing the pressure.

13. A method of curing composite sheets of superimposed layers of fibrous sheet material impregnated with a binder which comprises superimposing the ends of a plurality of such sheets to form a composite sheet and, continuously and without interruption, subjecting successive portions of the composite sheet to heat and pressure, and cooling such portions without releasing the pressure.

In testimony whereof, I have hereunto subscribed my name this 28th day of Jan. 1919.

DANIEL ADAM DICKEY.